L. Sisson,
Rake.
No. 102,919.                    Patented May 10. 1870.
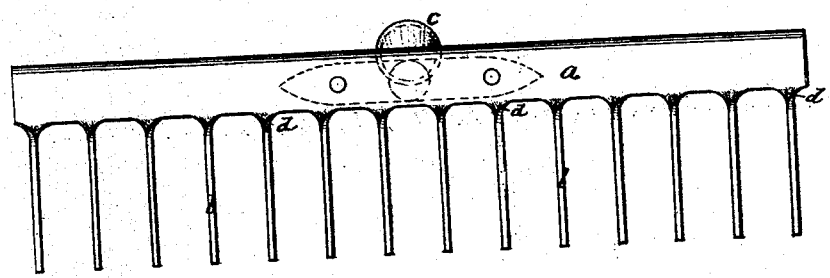
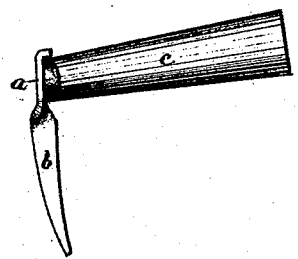
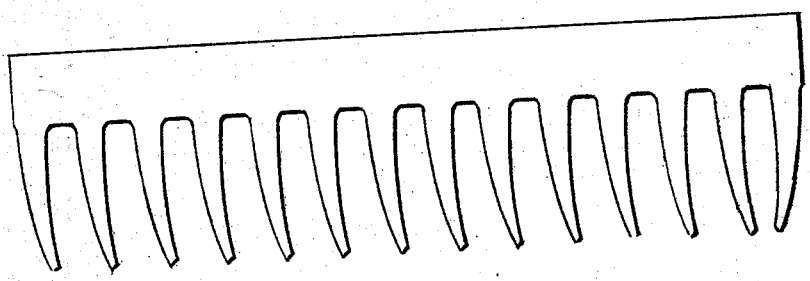
Witness
S. B. Kidder,
M. W. Frothingham.
Luther Sisson,
by his Atty,
Crosby Halsted & Gould

United States Patent Office.

LUTHER SISSON, OF NORTH EASTON, MASSACHUSETTS.

Letters Patent No. 102,979, dated May 10, 1870.

IMPROVEMENT IN GARDEN-RAKES.

The Schedule referred to in these Letters Patent and making part of the same.

*To all whom it may concern:*

Be it known that I, LUTHER SISSON, of North Easton, in the county of Bristol and State of Massachusetts, have invented an Improvement in Rakes and Tined Implements; and I do hereby declare that the following, taken in connection with the drawings which accompany and form part of this specification, is a description of my invention sufficient to enable those skilled in the art to practice it.

My invention relates particularly to the manufacture of that class of garden-rakes in which the teeth are integral with the bar or cross-head from which they project.

As heretofore or ordinarily made, the teeth are forged or drawn out from the bar (in forged rakes) or are cast with the bar when made of malleable iron. The teeth of such rakes are always somewhat weak, and this is especially the case with the cast-metal rakes, which have proved to be of but very little value.

In my invention, I make the rake from a plate of steel, punching out the metal so as to leave angular projections from the tooth-bar or cross-head, which projections are twisted a quarter-turn at the points where they spring from the bar, thus forming teeth, each of which is of the thickness of the plate from which it is punched, (from point to head,) but of an increasing width from point to head, the twist giving great strength to the teeth to resist both lateral and lengthwise strain, while the thinness and uniform thinness of each tooth, in the direction in which the rake is to be moved, enables it to sink readily into the soil and run easily through it.

Tines of dung-forks may be similarly made; and

My invention consists primaily in a toothed or tined implement, having its teeth punched from plate metal, and as projections from the head, such teeth or tines being subsequently twisted a quarter-turn at their points of union with the bar or head from which they project.

The drawings represent a rake embodying my improvement.

A shows a rear elevation of the rake.

B, an end view of it.

C shows the punched blank before the teeth are turned.

*a* denotes the bar or cross-head,

*b*, the teeth, and

*c*, the handle-shank.

To form the teeth, I take a piece of plate-steel of the proper width, and, by a suitable punch, I cut out therefrom the metal, so as to leave a blank or bar with teeth projecting therefrom, as seen at C. I then, by suitable mechanism, impart a twist to all these projections at their wide or upper ends, where they join to or spring from the bar, so as to bring the teeth into such position (as seen at A) that the thickness of each tooth in the plane of its movement is the thickness of the metal plate from which the blank is punched, while the tooth tapers in width in accordance with the angularity given to it in punching, as seen at B, the metal being quite wide where it springs from the bar, as seen at C, and having great strength imparted to it (by reason of the twist) to resist all strains.

All the sides of the series of teeth are parallel, as seen at A, so that the rake runs very easily, as before observed.

In the manufacture of these rakes, it will be obvious that two blanks may be punched from one plate, the teeth of one being punched out of the metal between the teeth of the other.

Rakes thus made are not only stronger than forged rakes, but are lighter and of less cost.

I am aware that mold-boards of cultivators have been formed (as shown in United States patent No. 9,314) by cutting a series of slits in one edge of a metal plate and bending up one corner of each part formed by the incisions. I am also aware that teeth of manure-forks have been twisted in drawing them. I am further aware that it is not new to punch out toothed blanks so as to form two comb-like blanks at one operation; and I do not claim so punching out blanks, nor drawing and twisting the teeth of tined implements, nor forming mold-boards or teeth, as shown in such patent No. 9,314.

I claim a rake in which (the blank being formed by punching out the metal between the teeth-forming portion) each tooth is twisted a quarter-twist where it joins the cross-head, as shown and described.

LUTHER SISSON.

Witnesses:
LEWIS H. SMITH,
JAMES HUMPHREY.